United States Patent [19]
Che

[11] Patent Number: 5,046,226
[45] Date of Patent: Sep. 10, 1991

[54] CONVERTIBLE BAR-PULLER/KNURLING-TOOL

[76] Inventor: Hue N. Che, 5636 Aldama St., Los Angeles, Calif. 90042

[21] Appl. No.: 337,079

[22] Filed: Apr. 12, 1989

[51] Int. Cl.$^5$ .................. B23B 25/00; B23B 15/00
[52] U.S. Cl. ........................................ 29/57; 82/127;
    29/27 C; 72/703; 414/14
[58] Field of Search .................. 29/27 C, 37 R, 37 A,
    29/38 B; 82/124, 126, 127, 162; 269/156;
    414/14; 72/703, 104, 108; 279/118, 7, 39, 35, 6,
    33; 81/90.2, 91.3; 294/115, 116; 408/240, 180,
    181, 159

[56] References Cited
U.S. PATENT DOCUMENTS

| | | | |
|---|---|---|---|
| 408,521 | 8/1889 | Quackenbush | 29/27 B |
| 2,546,058 | 3/1951 | Boulet | 72/703 X |
| 2,654,276 | 10/1953 | Jones | 72/703 X |
| 2,684,604 | 7/1954 | Froberg, Jr. | 72/108 |
| 2,870,662 | 1/1959 | Poorman | 72/703 X |
| 3,067,637 | 12/1962 | Horning | 408/181 X |
| 3,635,572 | 1/1972 | Robinson | 408/181 |
| 4,211,123 | 7/1980 | Mack | 294/116 X |
| 4,924,738 | 5/1990 | Che | 279/23 A X |

Primary Examiner—Larry I. Schwartz
Assistant Examiner—Robert Schultz
Attorney, Agent, or Firm—Christie, Parker & Hale

[57] ABSTRACT

The convertible bar-puller provides a convertible tool for automatic lathes. This tool has two main parts; a housing head and a shank. The housing head is attached to the shank using an adjustable connection means allowing the housing head to be positioned vertically with respect to the shank. The shank includes flat sides and radius corners to be received in either an internal tool housing or an external tool housing on the turret of the lathe. Positioning of the head on the shank in a first position fixed with the shank even with the upper end of the housing head adapts the tool for an external tool housing while fixing the head in the middle of the shank adapts the tool for an internal tool housing. Jaws for engaging the object to be machined extend forwardly from the head and have an adjustable jaw opening. The jaws each comprise a finger portion and an end portion, the end portion received in a circular groove on a jaw setting screw internal to the head. Adjustment of the jaw setting screw engages the end portions of the jaws causing the jaw opening to be varied as the jaw setting screw is turned. Gripping caps may be added to the tips of the fingers on the jaws for protection of the fingers and by providing dissimilar length of the caps. Hexagon, octagon, or square material bars may be rotated to a position in which the flats may be engaged by the gripping caps. Knurling wheels may be added to each jaw to convert the bar puller into a knurling tool.

11 Claims, 4 Drawing Sheets

CONVERTIBLE BAR-PULLER/KNURLING-TOOL

FIELD OF THE INVENTION

The present invention relates to a bar-puller, which can be convertible to fit to either external cutting-tool housing, or internal cutting-tool housing, for feeding bar material for lathes, preferably, for C.N.C. lathes. The device also can be turned into a knurling-tool by attaching a knurling-wheel on jaws reconfigured to rotatably support a knurling wheel.

BACKGROUND OF THE INVENTION

Many bar-pullers have been made and sold on the commercial market in the U.S. Most of them are for mounting on internal cutting-tool housing. No one can be convertible to fit both internal cutting-tool housing and external cutting-tool housing.

Besides the primary mentioned advantage, the present invention concentrates more improvements upon the prior bar-pullers, that can be cited as follows:

Jaw-opening can be set to any bar size continuously within its range, generally from 1/16 inches to 2 inches.

Jaw-opening self-centers automatically.

Jaw-opening center can be adjusted positioning to match material bar center.

Being able to pull hexagon, octagon or square bar.

Being able to attach a knurling tool.

The Toffolon U.S. Pat. No. 4,522,092 is directed to a bar-puller having the jaw-opening being adjusted to bar size by steps of 1/16 inches, individually for each jaw.

The A.T.S. bar-pullers have a shank and a set of many interchangeable pads.

The Hardinge feed fingers also have many different pads for different bar sizes.

U.S. patent application Ser. No. 276,242, filed on Nov. 22, 1988, and issuing as U.S. Pat. No. 4,924,738 on May 15, 1990 and having a common inventor with the present application, employs a jaw arrangement desireable for use with the present invention. However, the bar-pullers disclosed therein are not adaptable for mounting on an external cutting tool housing.

Figure 1:
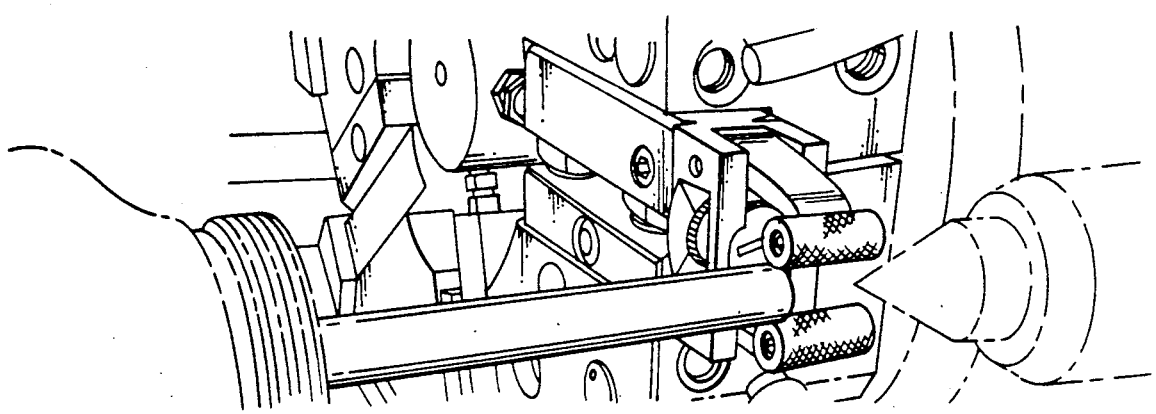
FIG. 1 is a view of the device mounting on an external tool housing.

DRAWING REFERENCE NUMERALS 1 housing head
2 shank
3 dovetail
4 groove for 3
5 slit
6 shank fixing screw
7 hole for 6
8 jaw-opening
9 flat sides on 2
10 round corners on 2
11 cutting position
12 cutting radius plane
13 object to be machined (hexagonal bar-stock)
14 jaw-opening middle plane
15 jaw setting screw
16 center head hole for 15
17 jaws
18 centripetal grooves
19 threaded shank of 15
20 head of 15
21 circular groove on 20
22 knurls on 20
23 front slot on 15
24 rear slot on 15
25 clearance for 19
26 roll pins for attaching 17
27 jaw attaching holes on 1
28 pivoting holes on 17
29 fingers of 17
30 inserted ends of 17
31 jaw fixing screw
32 hole for 31
33 piece of bronze for protecting 19
34 windows
35 teeth on 17
36 gripping caps
37 cap fastening screws
38 position mark on 2
39 mark for external tool mode
40 mark for internal tool mode
41 knurling wheels
42 reformed jaws

DETAIL DESCRIPTION OF THE INVENTION

Figure 3:
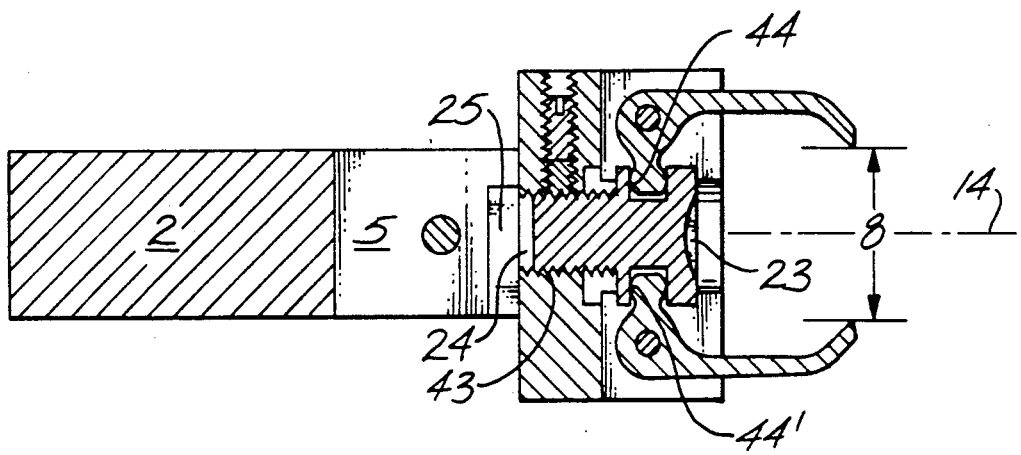
FIG. 3 is a sectional side view of the device, when shank is fixed on middle of housing head.
Figure 4:
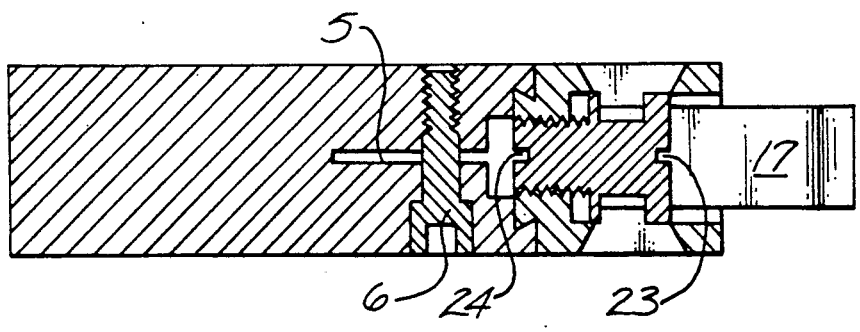
FIG. 4 is a sectional top view of the device, when shank is fixed on middle of the housing head.
Figure 5:
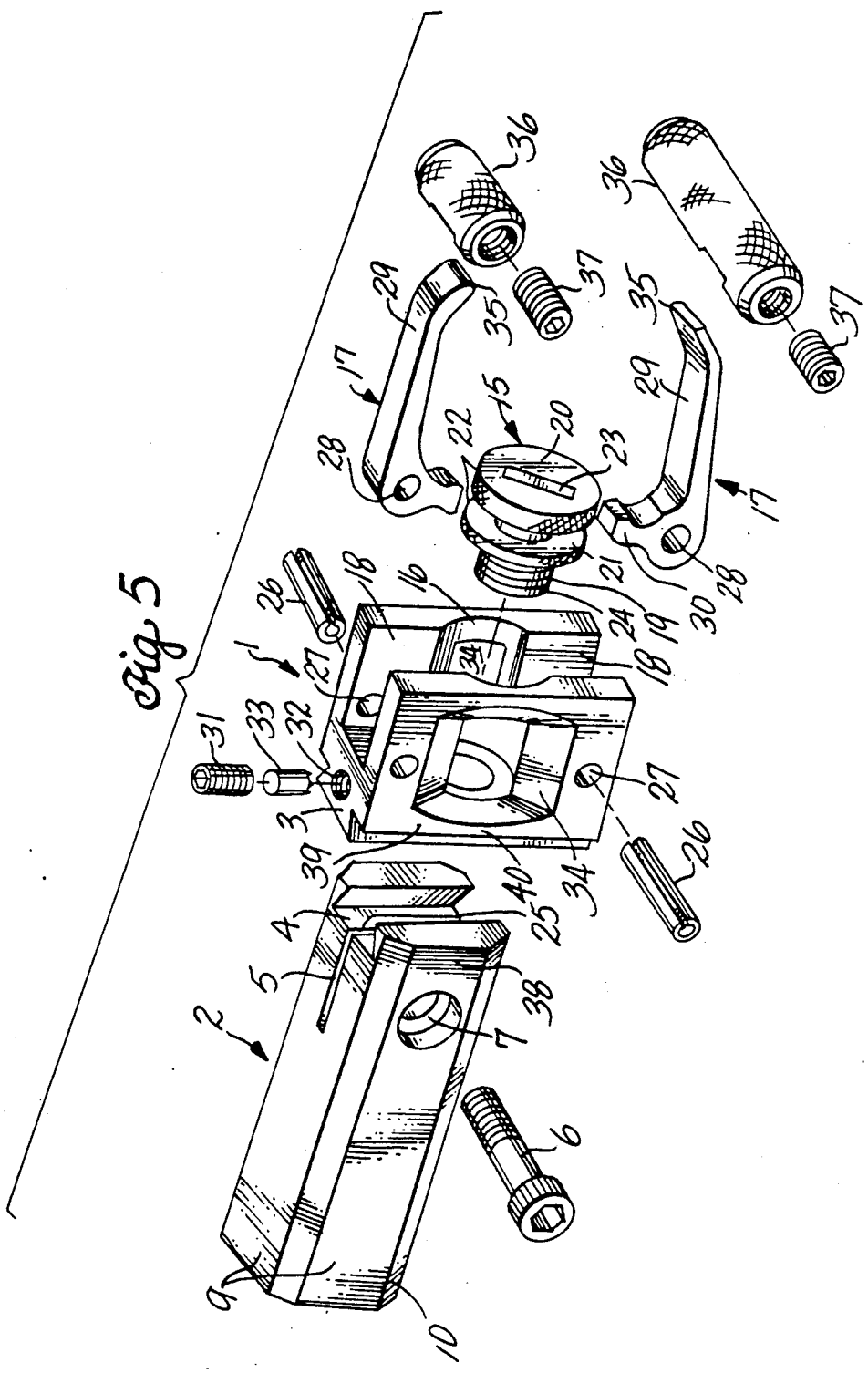
FIG. 5 is a view of the device being apart.

In FIG. 3, FIG. 4, and FIG. 5, the housing head 1 is attached to shank 2 by a connection means comprising dovetail 3, which fits snugly in groove 4. Slit 5 allows the width of groove 4 to be changed slightly by loosening or tightening of screw 6 in hole 7 providing a means for locking the connection means. Hole 7, on near side of slit 5, is large and deep enough for shank and head of screw 6 to fit flush; and on far side of slit 5, is threaded and fitted to screw 6. When screw 6 is loose, dovetail 3 can be slidably adjusted in groove 4 to bring jaw-opening 8 to match material bar on the lathe's chuck. When shank 2 reaches a chosen position, screw 6 will be tightened to fix shank 2 on housing head 1.

Most of turret lathe and chucker lathe have even quantity of tool stations, which are in 2 groups for: external cutting tools (O.D. tools), and internal cutting tools (I.D. tools). Most O.D. tool housings are adapted to receive a square shank, therefore, shank 2 has flat sides 9, and most I.D. tool housings are adapted to receive a round shank, therefore, shank 2 has round corners 10.

Figure 2:
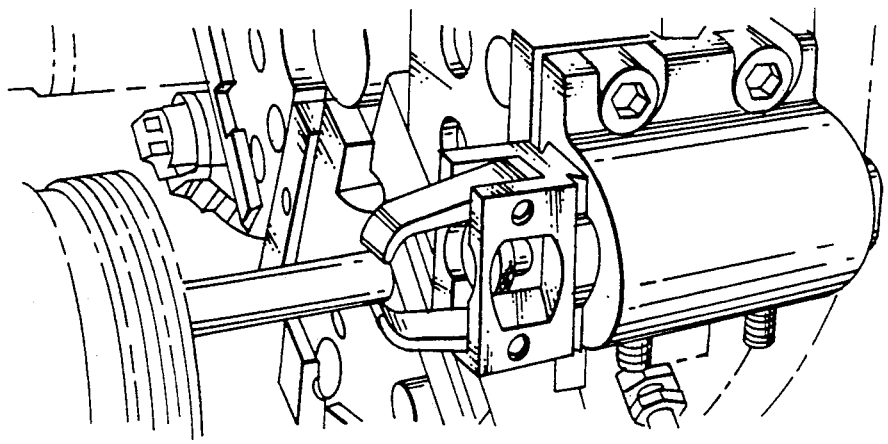
FIG. 2 is a view of the device mounting on an internal tool housing.
Figure 6:
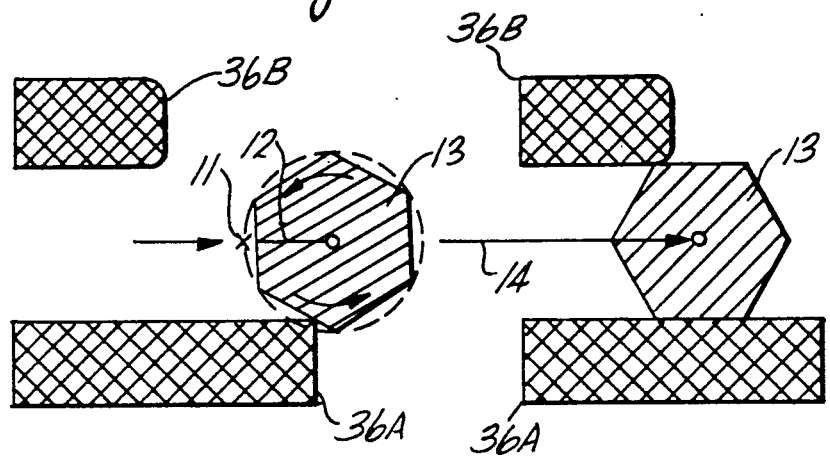
FIG. 6 shows how the uneven gripping caps can grip hexagon bar.
Figure 7:
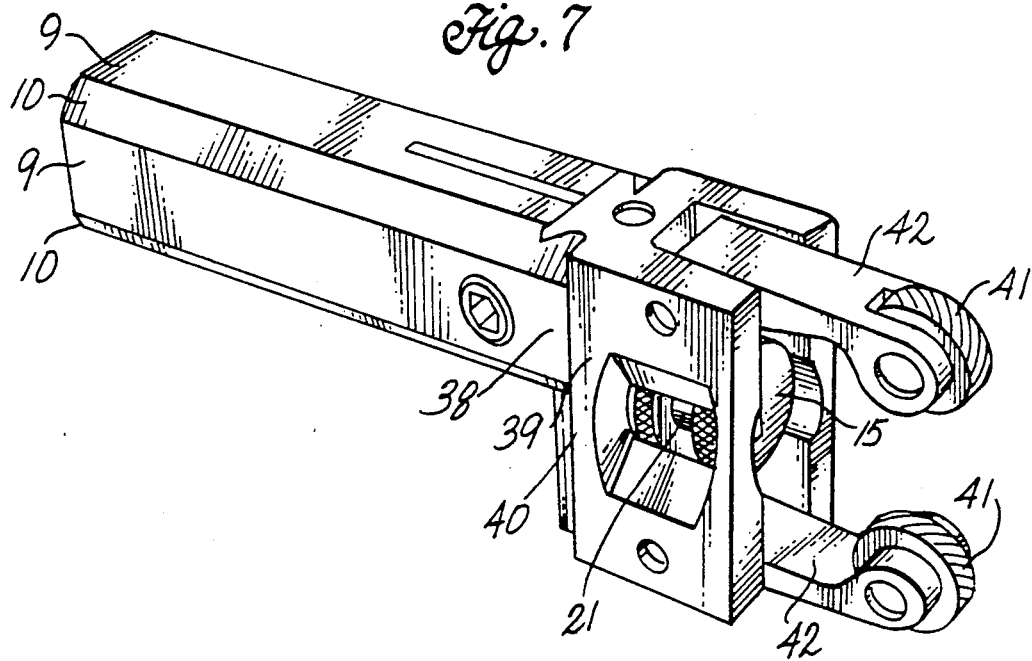
FIG. 7 shows how such bar puller can be turned into a knurling tool.

Generally, O.D. cutting tools have a cutting edge on one side of their square shank, to meet the cutting position 11, which is on the cutting radius plane 12 of the object to be machined 13 as best seen with relation to the hexagonal bar shown in FIG. 6. When the device is mounted on an O.D. tool housing as best seen in FIG. 1, shank 2 is fixed on one side of housing head 1 as best seen in FIG. 7, to have jaw-opening middle plane 14 meeting the said radius plane 12 as shown in FIG. 6, and when the device is mounted on the I.D. tool housing as shown in FIG. 2, shank 2 is fixed on the middle of head 1 as best seen in FIG. 3, to have said middle plane 14 meeting said radius plane 12.

In FIG. 5, housing an adjustment means comprising head 1 provides housing for jaw setting screw 15 in center head hole 16, and for two jaws 17 in two centripetal grooves 18 said setting screw 15 has a threaded shank 19 received in threaded bore 43 and enlarged head 20, having circular groove 21. Said enlarged head 20 is surrounded with knurls 22 for turning jaw setting screw 15 with the fingers. Slots 23 and 24 are for heavier screw turning with screwdriver. Clearance 25 provides room for threaded shank 19. Jaws 17 will be attached in said grooves 18 by pins 26 through holes 27 on head 1 tightly, and therein between, through pivoting holes 28 on jaws 17 snugly. Two jaws 17 are opposed and faced to each other, with fingers 29 which curve inwardly toward the middle plane 14 projecting forward which are substantially perpendicular to the fingers 29 and have radiussed edges 44 to form the jaw-opening 8, symmetrically. Inserted ends 30 of jaws 17 will be engaged in circular groove 21, for following groove 21 which tranverses laterally, when jaw screw 15 is turned, causing jaw-opening 8 to change width continuously therefore, jaw-opening 8 can be set to any bar diameter within a range determined by thread length on jaw setting screw 15 and consequent allowable lateral displacement. Jaw screw 31 in hole 32 will depress a cylindrical piece of bronze 33 on threaded shank 19 to lock setting screw 15 from turning, providing for a fixing jaw-opening 8. Piece of bronze 33 is soft material, used to protect threaded shank 19 from ruining. Two windows 34 on both sides of head 1 are for jaw-opening setting with fingers on knurls 22 around head 20.

Jaw-opening 8 may be set without shank 2 on, by turning jaw setting screw with screwdriver in slot 24, then windows 34 and knurls 22 may be eliminated.

Teeth 35 which terminate the inward curving fingers 29 may be employed directly for gripping objects to be machined or they may be capped with a cylindrical knurled gripping cap 36 on each tooth. The gripping caps protect the teeth from wearing out and may provide a guide for turning hexagon, octagon, or square bars held in the lathe chuck which turns freely on the spindle when not under power. One gripping cap 36A is longer perpendicular to the fingers than the opposing cap thereby engaging the bar as shown in FIG. 6 to rotate the flats for alignment with the gripping caps prior to engagement of the shorter gripping cap 36B. Each gripping cap 36 will be attached on a tooth 35 by a cap fastening screw 37.

When shank 2 is fixed on head 1 with marks 38 and 39 alined, the device is in O.D. tool mode; and when shank 2 is fixed on head 1 with marks 38 and 40 alined, the device is in I.D. tool mode. Therefore, this device is convertible.

FIG. 7 demonstrates an alternate embodiment of the present invention to allow attachment of a knurling tool. Jaws 17 of the previously described embodiment are replaced by jaws 42 which are reconfigured to incorporate rotatable support for knurling wheels 41.

DESCRIPTION OF OPERATION OF THE INVENTION

The convertible bar puller is designed for fitting on either I.D. or O.D. tool station on a turret of a lathe, so that gives the job planer more choice, when he decides to use the device on the most convenient station, for each job. In addition, in O.D. tool mode, this device can pull a bar for machining long/thin parts, which need support by tailstock, without interference by said tailstock (as shown in FIG. 1).

Setting a convertible bar puller the present invention is so simple and easy that any new machinist can do in a minute, he just simply turns jaw setting screw until jaws grip material bar, then without the bar on jaws, he turns 1/16 to 1/18, 66 of 1 turn more, so the jaw-opening is slightly smaller than the said bar, about 0.010 inches to 0.040 inches.

By approaching of turret, when the device is on working station, and when the lathe spindle stops turning, the jaw-opening is forced onto and engages the residual bar on the chuck. The difference in sizes of jaw-opening and of bar, forces the resilient fingers 29 to expand, consequently, gripping of the jaws on the bar is firm under pressure provided by the resilient fingers 29. The more jaw-opening is smaller than material bar diameter, the greater pressure of jaws on bar is. Then, chuck opens before bar will be pulled forward by longitudinal sliding back of turret to a certain length of protruding bar. Next is chuck closing, and then, bar is released by sliding back of turret to its index position. Finally, the lathe is ready for the next cycle of machining operation.

To make knurl on external portion of a machined part, a knurling head as described previously with respect to FIG. 7 will be fixed on shank 2, in O.D. tool mode. The bar puller then is a knurling tool, which will be mounted on one of the O.D. tool housings. The knurling wheels present on the reconfigured jaws are applied to the machined part by operation of the turret as previously described with respect to the bar-puller. However, the machined part is now turning and the turret is translated longitudinally within the knurled portion length. Use of the knurling tool as described for the present invention provides equal pressure from the opposed knurling wheels therefore knurling of long or thin parts may be accomplished without the problems associated with single sided knurling tools incurred in the prior art wherein the part to be knurled is pushed aside and bent.

I claim:

1. A convertible bar-puller for fitting into internal cutting tool housing and external cutting tool housing on a turret of a lathe, said bar-puller comprising:
   a shank having flat surfaces adapted for receipt in an external cutting tool housing and having rounded corners adapted for receipt in an internal cutting tool housing;
   a housing head having a first moiety of a connection means receivable in a second moiety of the connection means in the shank, the connection means adjustable in a direction perpendicular to the shank for positioning the first moiety within the second moiety,
   means for locking the connection means to fix the adjusted position of the head relative to the shank,
   a pair of jaws, each pivotally attached to the housing head and having finger portions projecting from the head opposite the connection means to form a symmetrical jaw opening,
   adjustment means engaging the jaws for varying the jaw opening; and
   means for locking the adjustment means.

2. A convertible bar puller as defined in claim 1 wherein the connection means comprises a dovetail attached to the housing head and a mating groove on the shank in which the dovetail is slidably received.

3. A convertible bar puller as defined in claim 2 wherein the shank contains a slit adjoining the groove and the locking means comprises a screw received in a hole, the hole traversing the slit and threaded on one side thereof.

4. A convertible bar-puller as defined in claim 1 further comprising a first indicia means for selectively positioning the positioning head in a first position with the shank in a middle portion of the housing head for use on an internal cutting tool housing and second indicia means for positioning the housing head in a second position with the shank on one side of the housing head for use on an external cutting tool housing.

the jaw setting screw further having a circular groove receiving the end portion of the jaws whereby the jaw end portions follow the groove when the jaw setting screw is turned thereby causing the jaws to pivot about the pivot pins and, means for locking the adjustment means.

5. A convertible bar puller for fitting into internal cutting tool housing and external cutting tool housing on a turret of a lathe, said bar puller comprising:

a shank having flat surfaces adapted for receiving in an external cutting tool housing and having rounded corners adapted for receipt in an internal cutting tool housing;

a housing head having a first moiety of a connection means receivable in a second moiety of the connection means in the shank, the first moiety adjustable perpendicular to the shank with respect to the second moiety;

means for locking the connection means to fix the adjusted position of the head relative to the shank;

a pair of jaws each pivotally attached to the housing head, each jaw comprising:

a finger portion projecting from the housing head and an end portion substantially perpendicular to the finger portion, the jaws being mounted to the housing head with a pivot pin intermediate the finger and end portions, and an adjustment means engaging the jaws for varying the jaw opening, the adjustment means comprising:
  a jaw setting screw threadably received in a threaded bore in the housing head, 6. A convertible bar puller as defined in claim 5 wherein the jaw setting screw has knurled surfaces for turning with an operator's fingers and further has a slotted end for turning with a screw driver, and wherein the housing head has windows through which the knurled surfaces of the setting screw may be reached.

7. A convertible bar puller as defined in claim 5 wherein the shank is removable from the housing head and the threaded bore extends through the housing head and wherein the jaw setting screw has a second slotted end for turning with a screw driver, the second slotted end exposed through the threaded bore when the shank is removed from the housing head.

8. A convertible bar puller as defined in claim 5 wherein the finger of each jaw includes a tooth terminating the finger and curving inwardly toward the opposing jaw.

9. A convertible bar puller as defined in claim 8 further comprising gripping caps removably attached to each tooth.

10. A convertible bar puller as defined in claim 9 wherein one of the gripping caps extends perpendicular to the fingers farther than the second other cap whereby contact of the longer gripping cap on an object to be machined, during cross sliding of the turret, will rotate a flat side of the object parallel to the gripping caps.

11. A convertible bar puller as defined in claim 6 further comprising a knurling wheel rotatably attached to each finger.

* * * * *